United States Patent
Taylor et al.

(10) Patent No.: US 6,310,949 B1
(45) Date of Patent: *Oct. 30, 2001

(54) INTELLIGENT COMMUNICATIONS NETWORKS

(75) Inventors: Andrew Paxton Taylor, Suffolk (GB); Steven Hollywood, Wellington (NZ)

(73) Assignee: British Telecommunications public limited company, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/776,676
(22) PCT Filed: Aug. 4, 1995
(86) PCT No.: PCT/GB95/01851
  § 371 Date: Jun. 25, 1997
  § 102(e) Date: Jun. 25, 1997
(87) PCT Pub. No.: WO96/04743
  PCT Pub. Date: Feb. 15, 1996

(30) Foreign Application Priority Data

Aug. 4, 1994 (EP) .................................................. 94305856

(51) Int. Cl.[7] ............................. H04M 1/64; H04M 7/00; H04M 3/00
(52) U.S. Cl. ................. 379/219; 379/88.22; 379/220.01; 379/243; 379/258
(58) Field of Search .................................... 379/201, 219, 379/220, 222, 244, 248, 266, 268, 271, 280, 309, 310, 207, 242, 243, 211, 212, 220.01, 221.02, 221.04, 221.08, 221.11, 258, 279, 88.22, 88.23

(56) References Cited

U.S. PATENT DOCUMENTS 4,791,665 * 12/1988 Bogart et al. ........................ 379/207

(List continued on next page.)

FOREIGN PATENT DOCUMENTS 0 378 694    7/1990   (EP) .
WO 91/17616  11/1991  (WO) .

OTHER PUBLICATIONS

O'Reilly, et al., Experiences In Prototyping The Intelligent Network, 1993, pp. 1923–1930.

(List continued on next page.)

*Primary Examiner*—Allan Hoosain
(74) *Attorney, Agent, or Firm*—Nixon & Vanderhye P.C.

(57) ABSTRACT

A service node is used in an intelligent communications network for providing services for customers. The node includes a server arranged to define a plurality of services; a plurality of resources each arranged to generate speech announcements in response to receipt of respective command signals and to provide an announcement finished signal when each generated speech announcement has finished being generated; a switch arranged to connect the resources to incoming calls routed by the network to the service node; and a controller arranged to respond to such incoming calls to place details of the calls in corresponding service queues, to receive from the server (a) a reserve resource request signal for reservation of a resource in respect of a call whose details have been passed to the server by the controller from the top of a service queue, thereby associating the call with the server, and in response to reserve a free one of the resources, (b) a connection request signal from the reserved resource to be connected to the call and in response to control the switch accordingly, (c) a command signal for the reserved resource to generate a corresponding speech announcement and in response to send the command signal to the reserved resource, (d) a signal for disassociating the server from the call and in response to store the current details of the call, (e) a signal indicating that the service defining means is ready to handle another call and in response to pass to the server the call then at the top of that service queue, and to receive from a reserved resource an announcement-finished signal, and in response to update the details of the corresponding call and to pass the updated details from store to the bottom of the corresponding service queue.

6 Claims, 10 Drawing Sheets

U.S. PATENT DOCUMENTS

| | | | | |
|---|---|---|---|---|
| 5,133,004 | * | 7/1992 | Heileman, Jr. et al. | 379/67 |
| 5,278,889 | * | 1/1994 | Papanicolaou et al. | 379/53 |
| 5,325,421 | * | 6/1994 | Hou et al. | 379/67 |
| 5,418,844 | * | 5/1995 | Morrisey et al. | 379/207 |
| 5,572,583 | * | 11/1996 | Wheeler, Jr. et al. | 379/207 |
| 5,583,920 | * | 12/1996 | Wheeler, Jr. | 379/88 |
| 5,703,935 | * | 12/1997 | Raissyan et al. | 379/88 |
| 5,742,905 | * | 4/1998 | Pepe et al. | 455/461 |
| 5,844,896 | * | 12/1998 | Marks et al. | 370/385 |

OTHER PUBLICATIONS

Hollywood, SCP Development in a Multi–processor UNIX Environment, 1992, pp. 278–287.

Yang, et al., The Design and Implementation of a Service Logic Execution Environment Platform, 1993, pp. 1911–1917.

van Hal, et al., Service Script Interpreter, an Advanced Intelligent Network Platform, 1990, pp. 12–22.

* cited by examiner

INTELLIGENT COMMUNICATIONS NETWORKS

RELATED APPLICATION

This is a National Stage Application of PCT/GB95/01851 filed Aug. 4, 1995.

BACKGROUND OF THE INVENTION

1. Field of the Invention

This invention relates to a method of and a service node for providing services in an intelligent communications network.

2. Related Art

Before the advent of the stored program controlled (SPC) exchange, the Public Switched Telephone Network (PSTN) comprised electromechanical exchanges, such as Strowger and Crossbar exchanges, and electronic exchanges, such as TXE2 and TXE4 exchanges. However, even the most advanced of these types was only capable of performing a limited number of functions over and above merely switching a call, i.e. making a connection between an incoming channel or line and an outgoing channel. Furthermore, such additional functions were limited to operations for improving the performance of the network, for example, repeat attempt at reaching a destination number via an alternative outgoing route in the event that the first-choice route is busy.

SPC exchanges enabled customers to control various supplementary services via signals entered on their telephone keypad using the * and # buttons. However, the introduction of a new service, or the modification of an existing service, meant that the control program had to be updated in each of the SPC exchanges.

The current concept of an intelligent communications network is based on a core of interconnected Digital Main Switching Units (DMSU's), with local exchanges connected to the DMSU's (usually with each local exchange connected to two DMSU's for network resilience in the event of an DMSU failure), and with services being provided and controlled by discrete service nodes at various positions in the network.

Each service node is connected to an DMSU of the network, which recognises service access digits dialled by a customer and routes the call to the service node for the provision of the requested service for the customer.

As an example of the abovementioned concept, an Intelligent Network testbed architecture is disclosed in the article "Experiences in Prototyping the Intelligent Network", by Peter O'Reilly, Hing Fai (Louis) Chong, Russell Sivey and Lawrence Lattanzi; IEEE Global Telecommunications Conference, Nov. 29 to Dec. 2, 1993; Volume 1 of 4, pages 1923 to 1930. In this architecture, a Service Control Point (SCP) is connected by a signalling link, known to telecommunications engineers as a C7 or SS7 link, to a switch. The SCP is also connected by a data link for call control commands and messages to an intelligent peripheral (IP) containing resources, such as announcements and digit collection. The IP is connected to the switch by a communications link providing a voice path.

The article "Service Script Interpreter, An Advanced Intelligent Network Platform" by Paul van Hal, Jan van der Meer and Nael Salah, published in Ericsson Review No. 1, 1990, pages 12 to 22, describes various network elements of Ericsson's Intelligent Network Architecture. One of these elements is an Intelligent Peripheral (IP) which is a collection of versatile and cost-effective equipment allowing communications between the Intelligent Network and its subscribers. The IP can send a number of different announcements to subscribers and receive digits from dual tone multi-frequency (DTMF) telephones, the announcements being either of a fixed format or having a variable part. The IP can be provided as a separate node accessible by several Service Switching Points (SSPs) through which it is controlled by commands from respective Service Control Points. Digits received by the IP are sent to the controlling SCP, through the associated SSP, for analysis.

In International Application Number PCT/US91/03086 (Publication Number WO 91/17616) a disk system stores voice message segments (VMS), each VMS having an identifying address number. When voice messages are to be played to subscribers, Send Message commands are sent via a voice message management module (VMMM) to an input/output processor which refers to a look-up table, by which it converts the Message Number to a respective sequence of VMSs, and retrieves the sequence of VMSs from the disk system. The VMM then sends corresponding commands, including fields designating the Channel Number, Call ID and Message Number of the message to be sent, into a command queue of a buffering interface module which receives the respective sequences of VMSs and inserts them into the required channel of a multiplexed transmission link to the switch.

In the article "SCP Development in a multi-processor UNIX environment" by S. Hollywood, Proc Int Council for Computer Communications, May 4–6, 1992, Tampa, pages 278–287, when an application passes a request to the Service Logic Execution Environment (SLEE) for, e.g., playing an announcement, it passes not only the request but the current call status or call context data. When the external request completes, the SLEE can send the resulting message and the call context data to any available application process for that service, since the package of data contains all the information for the call

SUMMARY OF THE INVENTION

According to a first aspect of the present invention there is provided a service node for use in an intelligent communications network for providing services for customers, comprising:

service defining means arranged to define a plurality of services; a resource arranged to generate speech announcements in response to receipt of respective command signals;

a switch arranged to connect the resource to incoming calls routed by the network to the service node; and controlling means arranged to respond to such incoming calls to place details of the calls in corresponding service queues, the node being characterised in that:

there are a plurality of said resources, each having a respective identity and each being arranged to respond to receipt of an announcement command by delivering a corresponding speech announcement over a respective speech path to the switch; and the controlling means is further arranged (a) to respond to receipt of a reserve resource request signal from the service defining means for reservation of a resource in respect of a call whose details have been passed to the service defining means by the controlling means from the top of a service queue, thereby associating the call with the service defining means, by selecting one of the resources whose status is free, changing its status to in use, and including the identity of the selected resource in the details of the call, (b) to respond to receipt of a connection request signal from the service defining means for the selected resource to be connected to the call by sending to the switch a connection command to connect the call to the respective speech path for the selected resource, (c) to respond to receipt from the service defining means of a command signal for the generation of a corresponding speech announcement and in response to send the command signal to the selected resource, (d) to respond to receipt from the service defining means of a signal for disassociating the service defining means from the call by storing the then current details of the call, (e) to respond to receipt from the service defining means of a signal indicating that the service defining means is ready to handle another call by passing to the service defining means the call details then at the top of that service queue, and (f) to respond to receipt from a resource of an announcement finished signal by updating the stored details of the corresponding call and passing the updated details from store to the bottom of the corresponding service queue.

Such a construction of service node enables efficient operation with the service defining means able to request a function without being involved in the management of that function, and the controlling means being responsible for selecting and relaying commands to a resource. Furthermore, because the identity of the selected resource is included in the call details upon its initial selection, this resource will remain reserved and associated with that call until the service defining means decides that the call is ended or that there is no further announcement to be sent to the customer.

Preferably, the controlling means comprises a common resource handler having a first part arranged to respond to receipt of the reserve resource request signal to perform the selection of the free resource and the provision of its identity for inclusion in the call details, and arranged to provide for the service defining means a resource reserved signal upon completion of the reservation of the free resource.

Preferably, the common resource handler also has a second part arranged to respond to receipt of the announcement command signal by selecting from a plurality of dialogue identities a dialogue identity having a free status, changing its status to in use, providing the selected dialogue identity to be included in the details of the call in association with the selected resource identity, and sending the announcement command in association with the selected dialogue identity to the selected resource.

According to a second aspect of the present invention there is provided a method of operating a service node in an intelligent communications network for providing services for customers, comprising the steps of:

receiving at a switch of the service node a call routed to the service node by the network, identifying the requested service and placing details of the call in a corresponding service queue;

passing the call details, when at the top of the service queue, to a service defining means of the service node when it is next ready to process a call;

selecting a free one of a plurality of resources of the service node, each being arranged to respond to receipt of an announcement command by delivering a corresponding speech announcement over a respective speech path to the switch;

changing the status of the selected resource from free to in use, and including the identity of the selected resource in the call details;

connecting the selected resource to the incoming call by the switch in response to a command from the service defining means;

generating by the selected resource a speech announcement corresponding to an announcement command from the service defining means;

storing the call details current at the time of commanding the selected resource and releasing the service defining means to process another call;

generating by the selected resource an announcement finished signal and in response updating the stored call details;

placing the updated call details at the bottom of the corresponding service queue; and maintaining the in use status of the selected resource until the call is terminated or the service defining means determines that the selected resource is no longer required.

Preferably, the selection of the free resource and the provision of its identity for inclusion in the call details are performed by a first part of a common resource handler of the controlling means, and including the step of providing by said first part a resource reserved signal for the service defining means upon completion of the reservation of the free resource.

Preferably, there are included the steps of selecting from a plurality of dialogue identities, by means of a second part of the common resource handler in response to receipt of the announcement command, a dialogue identity having a free status, changing its status to in use, providing the selected dialogue identity to be included in the details of the call in association with the selected resource identity, and sending the announcement command in association with the selected dialogue identity to the selected resource.

BRIEF DESCRIPTION OF THE DRAWINGS

A specific embodiment of a service node in accordance with the present invention will now be described by way of example with reference to the drawings in which.

DETAILED DESCRIPTION OF EXEMPLARY EMBODIMENTS

Figure 1:
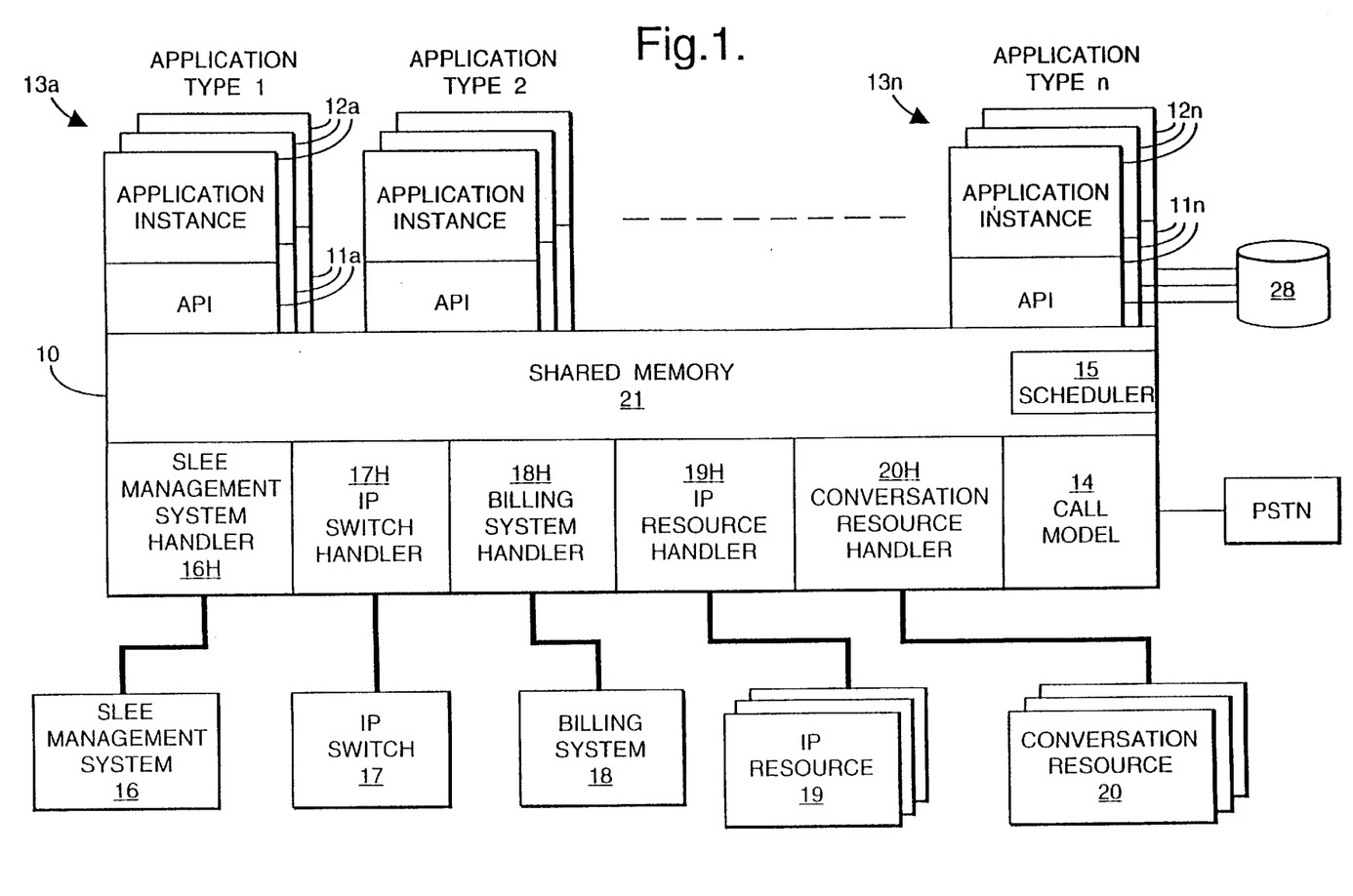
FIG. 1 is a schematic diagram of a Service Logic Execution Environment of the service node.

As can be seen in FIG. 1, the major part of the service node of the present invention is the central control function which is designated the Service Logic Execution Environment (SLEE) 10 and which constitutes a controlling means of the present invention.

The SLEE 10 comprises a respective Application Programming Interface (API) process, 11a to 11n, for each of a plurality of Application Instances (constituting service defining means of the present invention), 12a to 12n, in each of a plurality of Application Types, 13a to 13n, a Call Model process 14, a Scheduler process 15, and a handler process for each of a plurality of subsystems of the service node, namely SLEE Management System 16, Switch 17, Billing System 18, a plurality of Intelligent Peripheral (IP) Resources 19 having a common handler 19H, and a plurality of Conversation Resources 20 having a common handler 20H.

In this specification the terms Intelligent Peripheral and Service Node are to be taken as having the same effective meaning, although, in practice, a Service Node is constituted by an Intelligent Peripheral together with a switch 17.

In this embodiment, each of the IP Resources 19 is a speech applications platform (SAP) containing its own digit collection means. In alternative embodiments, there is a plurality of digit collection means which can be reserved and associated with a SAP as and when needed for services involving digit collection.

Each of the Conversation Resources 20 is a non-speech resource, i.e. a resource which is not connected to a port of the switch 17 and which is not arranged to send or receive signals from the customer (MF signals or speech). Examples of types of Conversation Resources 20 are personal identification number (PIN) validation, protocol conversion for when the service node needs to communicate with a remote resource or system, and management logic for managing entries in database 28.

For convenience, the above processes will generally be referred to by the process name, and each handler will be identified as 16H, 17H, etc. Handler 19H has an internal part 19Hint which interfaces signals between applications and a Shared Memory 21 of the SLEE, and an external part 19Hext which interfaces signals to and from the IP Resources 19.

Each of the component parts of the SLEE 10 is implemented as a UNIX (a trade mark of AT & T) process on a platform which need not be described in detail but which is in the form of a multi-processor, multi-tasking, fault tolerant UNIX environment. Where appropriate, these processes comprise sub-processes for both-way communication of messages. Such sub-processes are well known to the skilled person in the art and will not be mentioned specifically, apart from Switch Message Handler 26, which constitutes a message receiving sub-process of the Switch Handler 17H.

The component processes of the SLEE 10 communicate with each other through a block of the Shared Memory 21 which they can all access. This arrangement of separate processes working in parallel greatly reduces the likelihood of serious bottlenecks.

Application Instances are started up by the SLEE Management System 16 at the initialisation of the SLEE 10 and each new call entering the platform creates a new Call Instance 22 (FIG. 2) in the Shared Memory 21.

Figure 2:
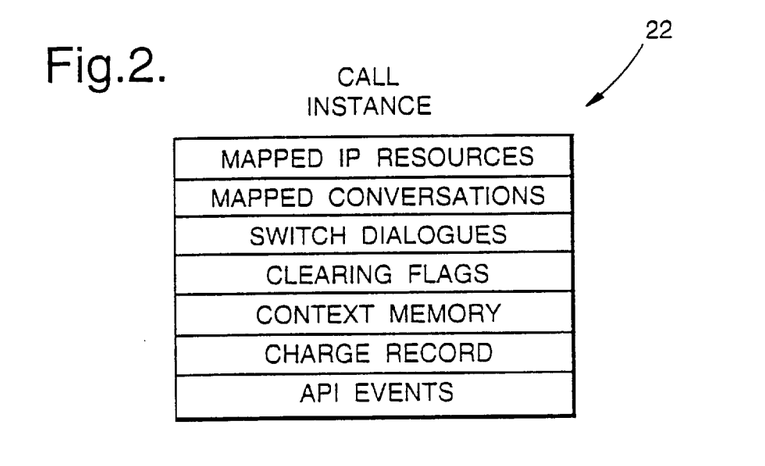
FIG. 2 is a diagram showing the storage locations of a Call Instance used in services provided by the service node.

Each Call Instance 22 holds data specific to a respective call, and the various categories of data shown in FIG. 2 are Mapped IP Resources, Mapped Conversations, Switch Dialogues, Clearing Flags, Context Memory, Charge Record, and API Events. Some of these categories have more than one storage location in the Call Instance, e.g. IP Resource and API Events.

Each Application Type 13 can provide one or more defined services, and different calls (possibly using different services) can all share any one Application Instance 13 by being cut in and out as the application requires. The Context Memory of a Call Instance 22 is used by an application to keep track of the state that a call is in.

Multiple Application Instances 12 of the same Application Type 13 are provided in order that a number of calls using the same service can run in parallel. The Scheduler 15 of the SLEE 10 manages the allocation of calls to the Application Instances 12 so that call events can be processed.

Figure 3:
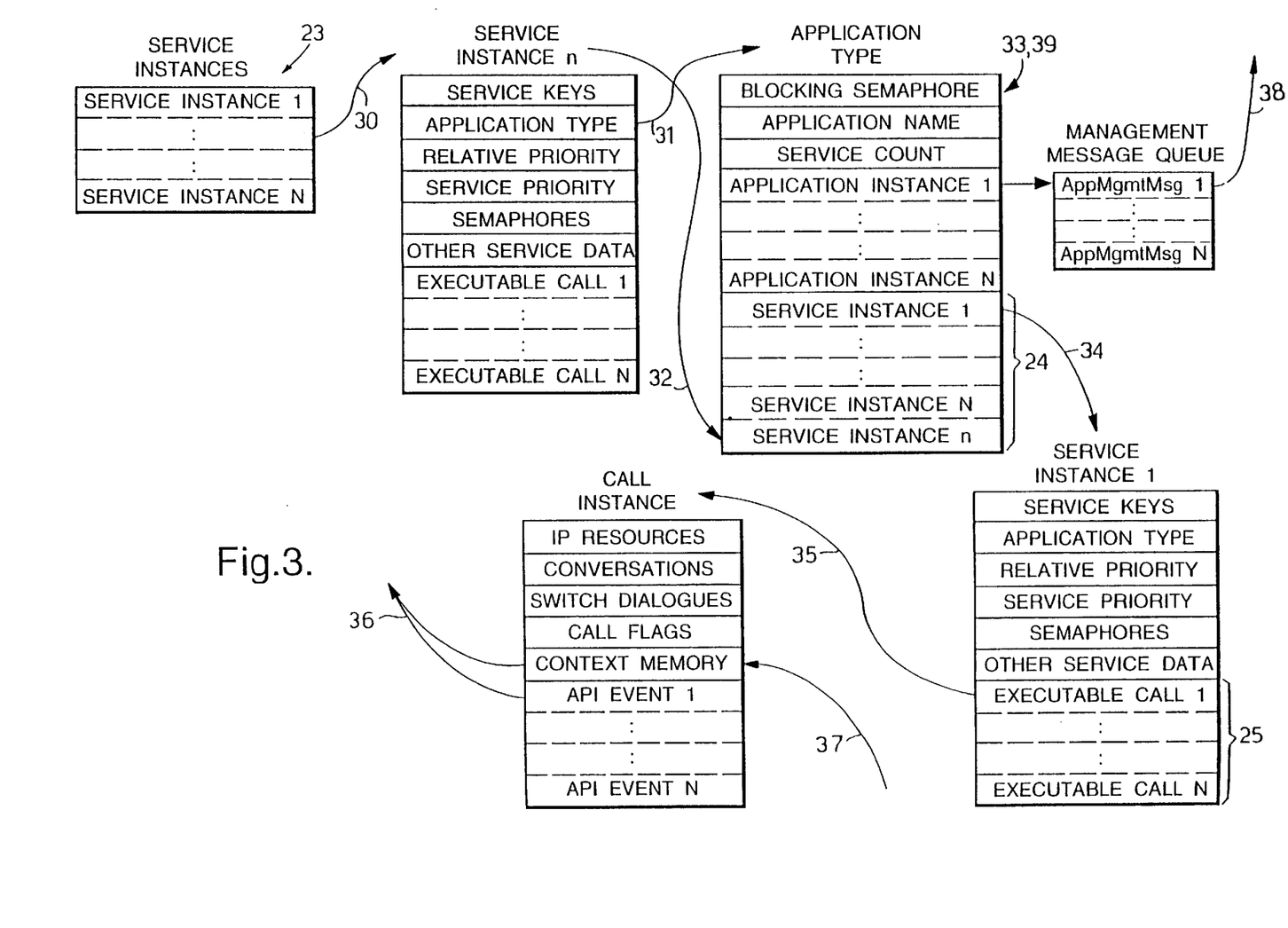
FIG. 3 is a diagram showing the processing of a Call Event.

As external events occur, the handlers queue them on their respective Call Instances 22. FIG. 3 shows the various steps by which these call events are retrieved and sent to an application for processing.

The Scheduler 15 decides which service will be the next to run on the basis of the relative priorities of each Service Instance 23. These priorities are recalculated each time that the Scheduler 15 is activated such as to ensure that whilst all services will run at some time, those with higher service priorities (which are set by the SLEE Management System 16) will run more often. The Service Instance with the highest relative priority and with Executable Calls queued on it is chosen to be run (this step is referenced 30 to avoid overlap with other reference numerals). The Scheduler 15 retrieves the service's owning Application Type (step 31) and adds the Service Instance 23 to the bottom of the Service Queue 24 (step 32). A Blocking Semaphore in the Application Type 13 is increased by the Scheduler 15 (step 33), signalling that another call is ready to be processed by one of the Application Instances 12 belonging to this Application Type 13. When this happens, the next Service Instance 23 is moved off the queue 24 (step 34) and the next Call Instance 22 is removed from its Executable Call Queue 25 (step 35). The first AP) Event belonging to this Call Instance 22 is sent together with the call's Context Memory to the application to be processed (step 36).

The application performs the tasks necessary to act upon this event, and upon completion of those application tasks it issues an API Suspend command and then an API Provide Instruction command, and modifies the Context Memory (step 37) to reflect the change of state of the call. Any Management Events queued for the application are issued to it (step 38) before the process blocks on its semaphore (step 39) ready for the next call event.

The application sends the API Suspend command to the SLEE 10 to release (dissociate) the Call instance 22 from the application, and sends the API Provide Instruction command to cause the application to become blocked ready for the next call.

There now follows a description of the processes which occur for a typical call scenario for a message recording service provided by the service node. Whilst there are many difference tasks that can occur, every call using the platform proceeds in a similar way to the following description.

Assume that a customer has subscribed to a network-based message recording service (hereinafter referred to as "voicemail service"), the platform (not shown) for which includes a database for storing deposited spoken messages and is associated with an DMSU of the PSTN. When the customer has activated the voicemail service, calls to the customer are automatically connected by the network to the platform and any desired spoken messages (hereinafter referred to as "voicemail messages") are recorded for later retrieval by the customer, and the voicemail platform will send information about the voicemail messages (customer account number, caller's name) to the application in the service node for storage in the database 28, which increments the stored calls register associated with that account number and stores the name in association with an index representing the current position of that voicemail message in the voicemail platform database.

When the customer wishes to find out if he has any voicemail messages waiting for him, he dials the service access digits for gaining access to the voicemail service and the PSTN routes the call (regardless of where it has originated on the network) to the service node.

Figure 4:
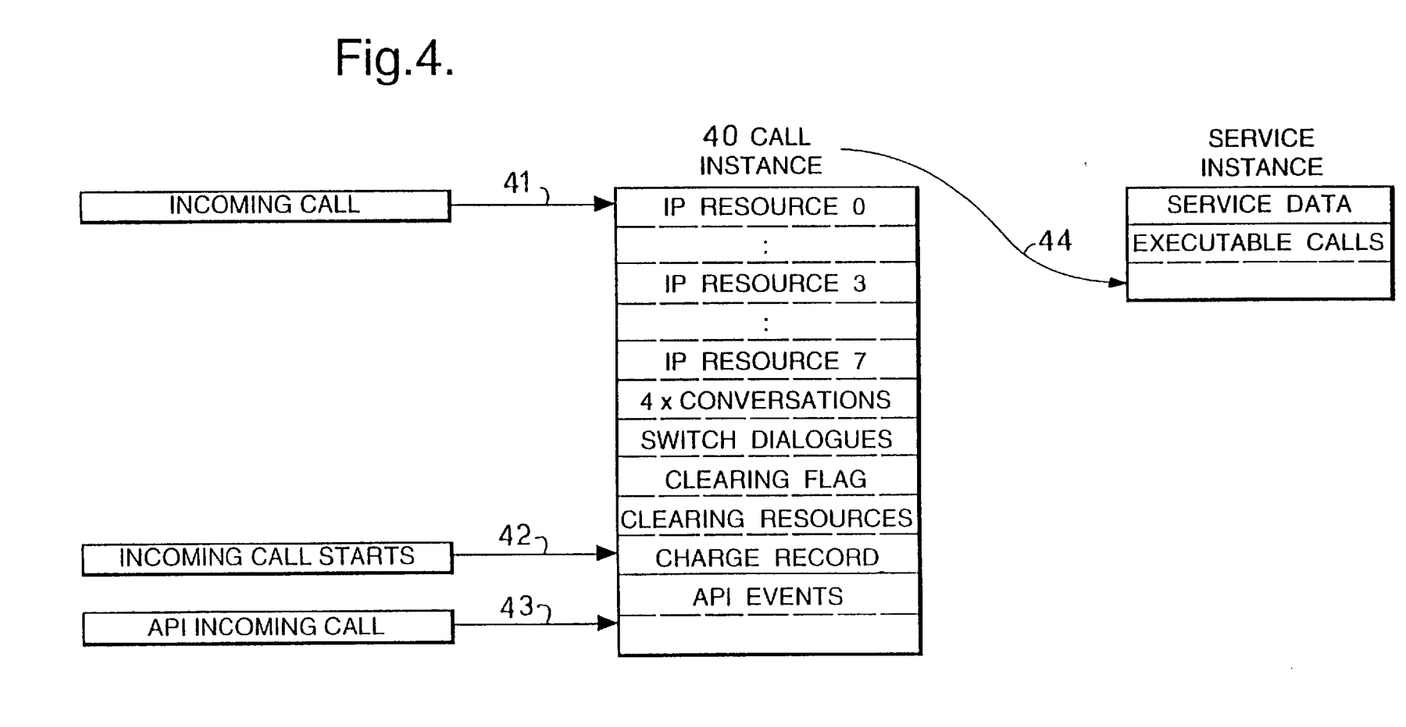
FIG. 4 is a diagram showing initialisation of the Call Instance.

Referring to FIG. 4, in which the steps are numbered starting from 11, when this call arrives at the service node the digits are passed via a signalling link from the switch 17 to the Call Model 14 which recognises the dialled service access digits for the voicemail service and, in response, creates and initialises a new Call Instance 22 (step 40) within the SLEE's Shared Memory 21 and maps the incoming call to its first IP Resource, namely IP Resource 0 (step 41). The actual IP resource will be the incoming channel on which the incoming call appears and it will be the identity of this channel that will be mapped to the IP Resource 0 location of the Call Instance 22. The Call Model 14 initialises the call's Charge Record by recording the incoming call or event with a time stamp (step 42) in the Charge Record location of the Call Instance 22. The SLEE 10 then puts an API Incoming Call event on the call's API Events queue (step 43) and queues the Call Instance 22 as an Executable Call on the appropriate Service Instance 23 (step 44).

The Scheduler 15 is triggered and the call event processing phase is entered, as described with reference to FIG. 5.

Figure 5:
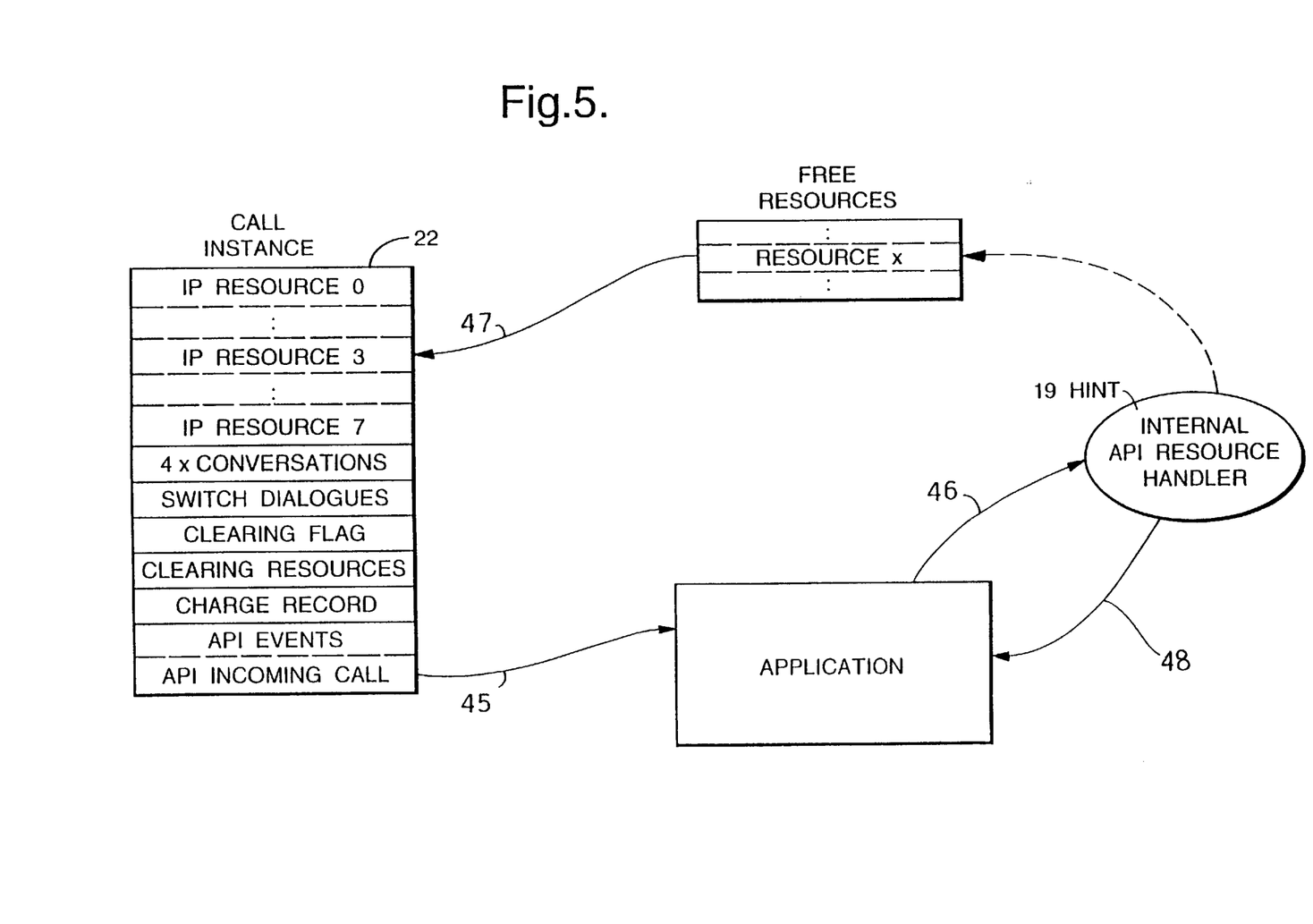
FIG. 5 is a diagram showing the allocation of a resource to the Call Instance.

Referring to FIG. 5, when the Scheduler 15 decides that it is time for a call to execute, the SLEE 10 sends to the Application 13 the API Incoming Call Event from the Call Instance's API Events queue (step 45). The application receives this event, refers to a state table of events (not shown) and runs from the next following position, which in this case of a new call is from the beginning of the service.

The application will require the use of at least one IP Resource other than IP Resource 0. First, it must reserve a resource on a free one of the call's application-mapped IP Resources (e.g. Resource 3) by sending an API Reserve Resource message to the SLEE 10 (step 46). The application will itself select the free IP Resource in the Call Instance 22 and ask the SLEE 10 to reserve a free resource and map its identity to the selected IP Resource. The SLEE's Internal API Resource Handler 19Hint receives the message, finds a free (unused) resource of the correct type in the Free Resources store (Resource X) and maps it to the call by moving the resource identity from Free Resources to the Call Instance's IP Resource 3 (step 47). In this step, the resource may be actually removed from Free Resources, or it may be effectively removed by setting a flag to mark that resource as in use and not free. A success message is returned to the application as a return code (step 48).

Figure 6:
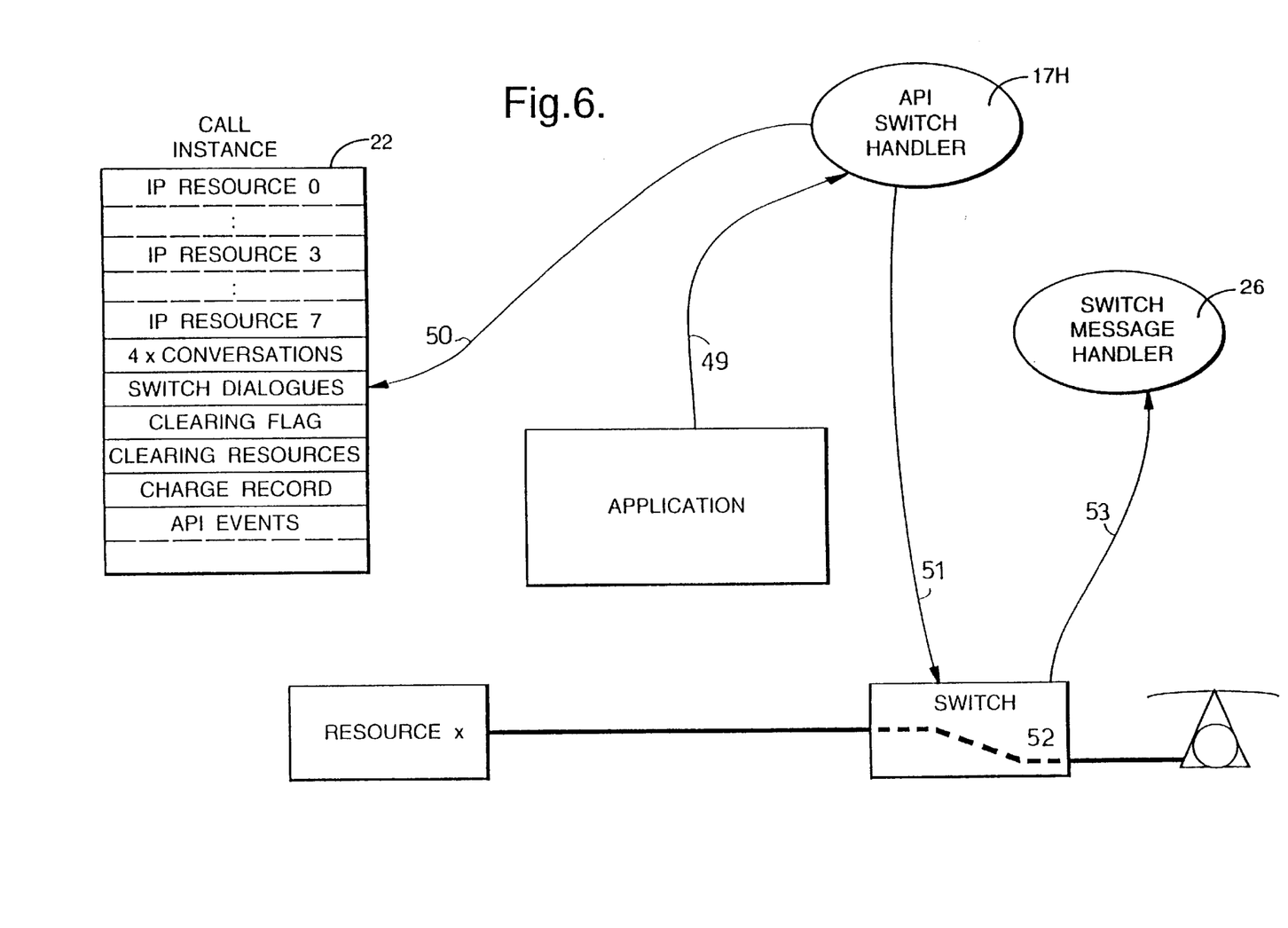
FIG. 6 is a diagram showing the connection of a speech path between the resource and a caller.

To make use of the resource the application must connect its speech channel to that of the call as shown in FIG. 6. It does this by sending an API Connect message (step 49) with reference to the two resources it wants to connect (i.e. IP Resource 0, the incoming call, and IP Resource 3, the required resource).

The SLEE's API Switch Handler 17H receives the message, allocates (reserves) a free Switch Dialogue Id to the Call Instance 22 (step 50) and uses it to send a request for connection to the switch 17 (step 51). The switch 17 receives the request and connects the call to Resource X (step 52). It signals success back to a Switch Message Handler 26 of the SLEE 10 (step 53).

Figure 7:
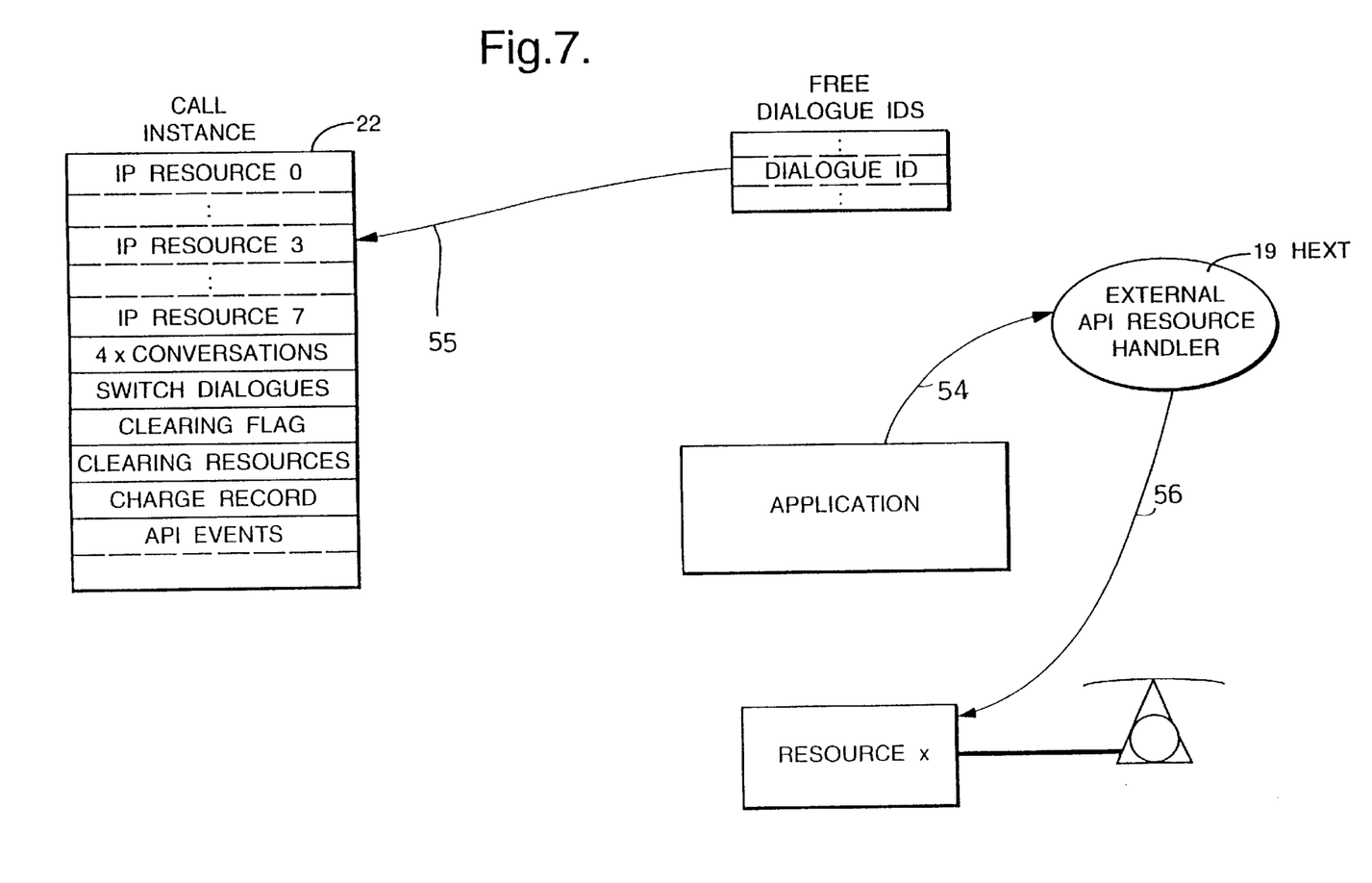
FIG. 7 is a diagram showing the command of the resource by an application.

Having reserved a resource, the application now communicates with it, for example in this scenario it requests that the resource play a recorded announcement to the customer. It does this, as shown in FIG. 7, by sending an API IP Resource Command to the SLEE 10 with the announcement type included (step 54). The SLEE's External API Resource Handler 19Hext receives this message and sets up a dialogue with the resource by allocating an Id from the Free Dialogue Id's store to the call's Application IP Resource (step 55). It then associates this Dialogue Id with the command and sends it to the mapped resource (step 56).

Having sent such a command, the application will leave the resource to generate the announcement and proceed to handle another call under the control of the Scheduler 15. To do this, the application must suspend the call by first sending an API Suspend command to the SLEE 10, and then sending an API Provide Instruction command.

In this scenario, this first API Resource Command is for generating a "Welcome" announcement and for collecting twelve digits representing the customer's account number and personal identification number (PIN).

Figure 8:
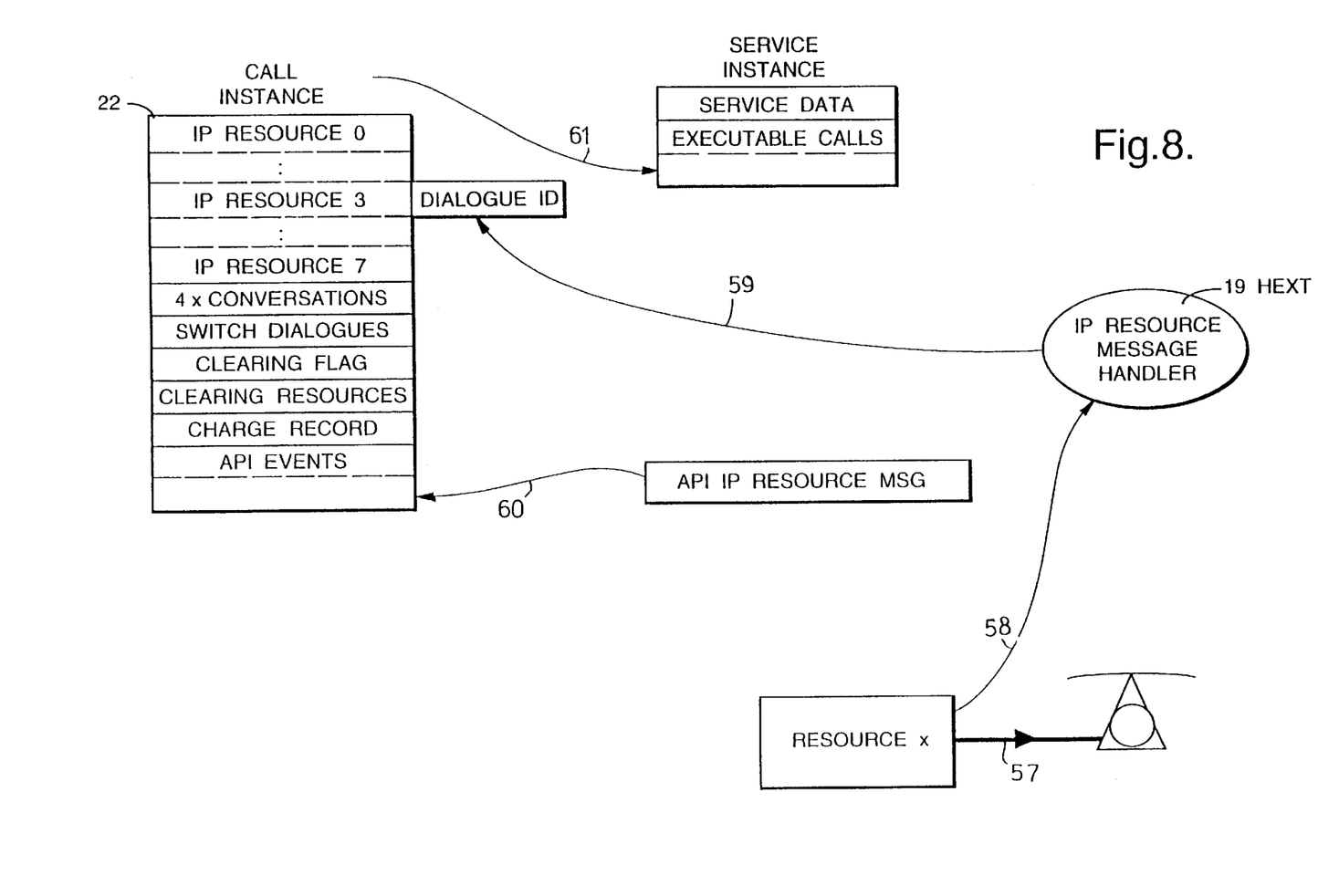
FIG. 8 is a diagram showing the response of the resource.

In FIG. 8, Resource X receives the application's command and starts generating the Welcome announcement, "Welcome to Voicemail. Please enter your account number and PIN." (step 57). Resource X is arranged to identify digits received at any time after the start of the Welcome announcement, and to stop generating the announcement at the time that the first of these digits is received and recognised.

On receipt of the first digit, Resource X sends to the SLEE 10 an API Event message including the value of the first received digit. This message is queued on the API Events section of the Call Instance 22. For the purposes of the present invention it is sufficient to state that this application requires the first digit to perform an initial part of the account number processing, and that not all applications involving account numbers require the first digit for initial processing. The dialogue between the application and the Resource X has not yet finished, i.e. it remains open, so the Dialogue Id is permitted to remain associated with the Call Instance's IP Resource.

Normally, the customer will enter his eight digit account number and his four digit PIN within a timeout started at the beginning of the announcement, and when twelve digits have been collected the Resource X will send to the SLEE 10 (step 58) a Digits Collected message containing the digits, this message being associated with the same Dialogue Id as was sent to the Resource X by the SLEE 10 with the command.

If the customer had failed to enter twelve digits before the timeout, or if for any other reason Resource X had not collected twelve recognised digits within the timeout, Resource X would have sent a Collection Failure message to the SLEE 10.

The application will deem the dialogue finished upon receipt of either the Digits Collected message or the Collection Failure message and will proceed to remove the Dialogue Id and to place it back in the list of free Dialogue Id's.

The SLEE's External IP Resource Message Handler 19Hext receives the message and retrieves the Call Instance 22 by means of the association with the Dialogue Id (step 59). The message is then added to the Call Instance's API Events queue as an API IP Resource Message (Msg) event (step 60) and the Call Instance 22 itself is added to the list of Executable Calls of the owning Service Instance (step 61). The Scheduler 15 is now triggered once again.

Figure 9:
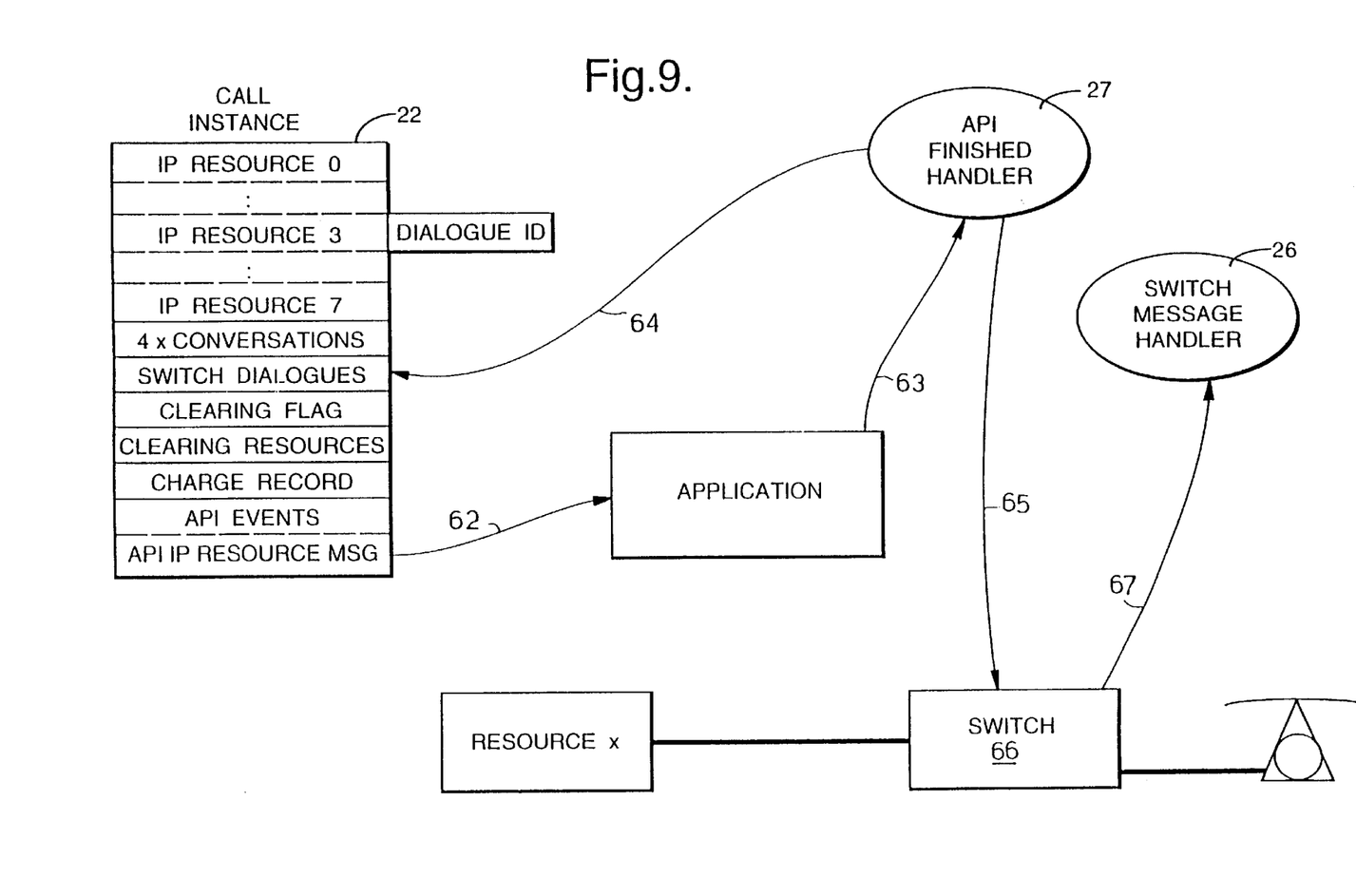
FIG. 9 is a diagram showing the procedure when the application has finished.

When the Scheduler 15 decides that it is the call's turn once more, the API IP Resource Msg event, and the message itself, are sent to the application (step 62), as shown in FIG. 9.

The application now proceeds to the next following state in the state table for the service and accesses a database 28 associated with that application type using the collected account number to retrieve a PIN stored with the account number and to compare the retrieved PIN with the collected PIN.

If the PINs match, the application accesses the database again to retrieve the customer style of address and the time (including date) when the last retrieve access was made, and to overwrite that time with the time of the present retrieval access. The application now sends a second API Resource command including two fields containing respective variable parameters, the first being the customer's address style and the second being the last retrieval time (including date). The application then sends an API Suspend command and an API Provide Instruction command and waits for the Scheduler 15 to send it details from the next selected Call Instance 22.

The SLEE 10 now allocates a new Dialogue ID, by the External IP Resource Handler 19Hext, and passes this second API Resource command to the Resource X in the same way as for the first API Resource command. On receipt, the Resource X generates an announcement having a number of fixed components and a number of variable components, namely, "Hello" (fixed), "Andy." (variable, the customer's style of address), "You last used voicemail at" (fixed), "three thirty pm" (variable), "on the" (fixed), "tenth" (variable), "of" (fixed), "June."(variable). This provides a measure of security, because if the customer had not accessed voicemail on that occasion he will now know that someone else was in possession of his PIN and can take steps to change his PIN.

When the Resource X has finished generating this second announcement it will send an API IP Resource Message to the SLEE 10 which will enter it in the Call Instance's API Events queue.

When the application next processes this Call Instance it will go to the next state which is to inform the customer how many voicemail messages have been deposited in his voicemail store. The application accesses the database to retrieve the number of deposited voicemail messages and sends a third API Resource command including a field containing this number and another field containing the time. Again, the application then sends an API Suspend command and an API Provide Instruction command.

The SLEE 10 sends this third command to Resource X, which is still reserved for this call, by allocating a free Dialogue ID in the same manner as before.

Resource X responds to this third command by generating an announcement comprising a plurality of components, two of which are variable components. The first component is "Good", which is fixed. The second component is variable and is selected from "Morning", "Afternoon", or "Evening" depending upon the value in the time field of the received command, i.e. the Resource X has three time windows, midnight to midday, midday to 6.00 pm, and 6.00 pm to midnight, and makes the selection by comparing the time value with the window boundaries to determine the appropriate window and hence the corresponding component. The third component is "Welcome to voicemail. You have", which is fixed. The fourth component is variable and is selected from a range of words (speech segments) corresponding to the possible number of voicemail messages in the voicemail message database, in other words, from "no" to, for example, "twenty". The fifth component is "new", which is fixed. The sixth component is variable and is selected from "message" or "messages" depending upon whether there is a single voicemail message or a plurality of voicemail messages or no voicemail messages.

In practice, the application will have further stages, e.g. asking the customer if he wants to know the names of the people who have deposited voicemail messages (when depositing a voicemail message they would have been asked to state their name), informing the customer of those names (possibly in association with voicemail message numbers), receiving the customer's selection and generating the voicemail message (by retrieval from the voicemail platform database), asking the customer if he wants to delete the voicemail message or leave it or archive it, and managing the voicemail message database in the event that the customer hangs up (terminates his call) during generation of a deposited voicemail message. However, the skilled person in the art will understand the operation of the service node and its SLEE sufficiently without a detailed description of such further stages of the voicemail service.

When the application reaches a final state, e.g. has received from the customer a positive indication that he is terminating his access to the service or has received from the Resource X that a timeout has occurred, then it sends an API Finished signal to the SLEE 10 (step 63). This is received by an API Finished Handler 27 of the SLEE 10 which commences to clear down the call.

First, the SLEE 10 must disconnect the speech paths. It allocates a free Switch Dialogue to the Call Instance 22 (step 64) and sends a message to the switch 17 requesting the disconnection of Resource X and the caller (step 65). The switch 17 performs the disconnection (step 66) and returns a Disconnection Complete message back to the SLEE 10 (step 67).

Figure 10:
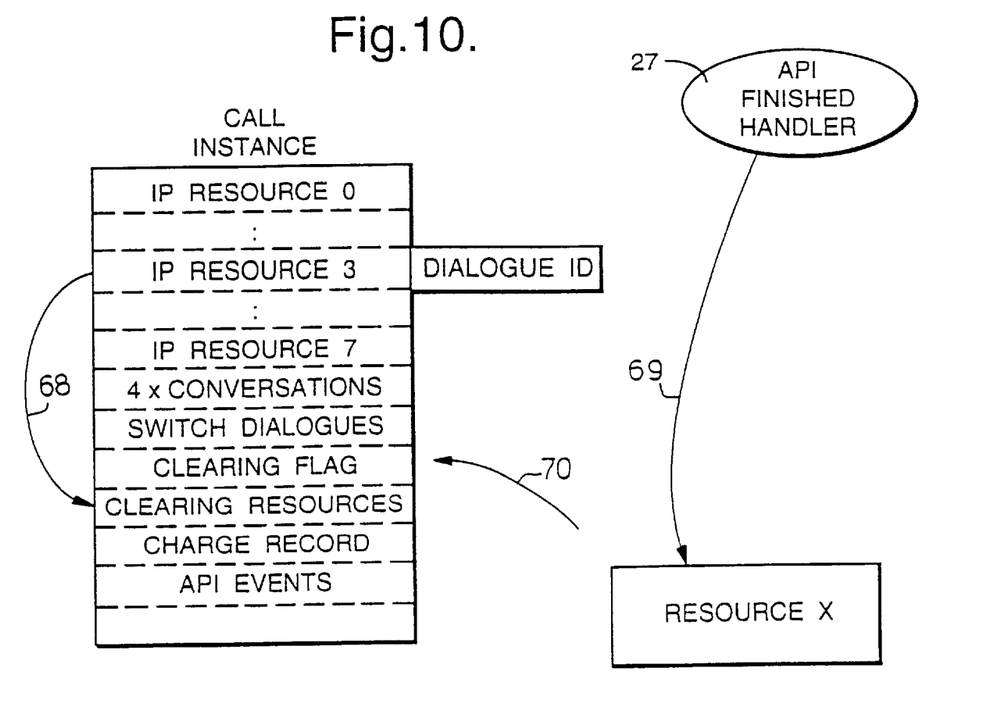
FIG. 10 is a diagram showing the procedure when the call clears.

If Resource X is still in open dialogue with the SLEE 10 then it must be cleared down. The SLEE 10 does this as shown in FIG. 10, by first sending the mapped IP Resource 3 into clearing by moving the mapped resource into the Call Instance's Clearing Resources location (step 68), and then sending a Clear Down message to Resource X (step 69). The incoming call is cleared in a similar way through the Call Model 14 and the call is marked as currently being cleared down (step 70).

Figure 11:
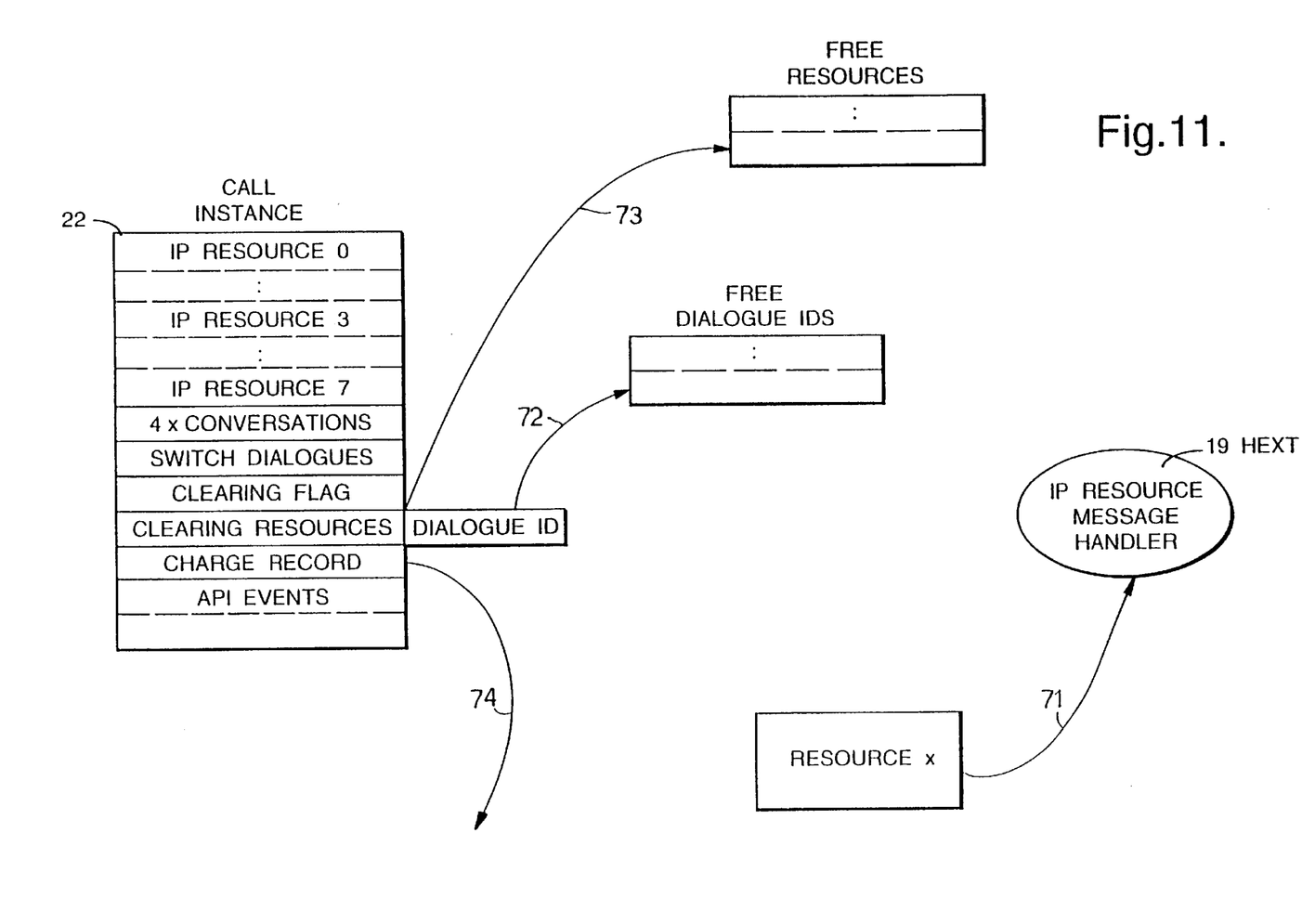
FIG. 11 is a diagram showing the procedure when the resource clears down.

Resource X receives the message and initiates its clear down procedure as shown in FIG. 11. When it has finished clearing down, it sends a Clear Down Complete message to the SLEE 10 (step 71). This message is received by the SLEE's External IP Resource Message Handler 19Hext which retrieves the Call Instance by means of the association with the Dialogue Id. This Dialogue Id is removed from the resource and placed back in the Free Dialogue Ids store (step 72). The resource itself is moved out of the Call Instance 22 and back into the Free Resources store (step 73).

If this was the last resource to clear belonging to the call (i.e. the incoming call has also finished clearing) then the call is complete. The Charge Record is time stamped and then sent out to the Billing System 18 (step 74).

What is claimed is:

1. A service node for use in an intelligent communications network for providing services for customers connected via local communication lines to service switching points of the intelligent communications network, said node including therewithin:

a service control point having service defining means and service controlling means;

a peripheral platform comprising a plurality of types of resources, wherein for each said types of resource there being a plurality of resources for performing a particular call processing function associated with the respective type of resource, the peripheral platform being coupled to the service control point via a respective signaling link; and, a switch arranged for connection between ones of a first set of ports and ones of a second set of ports, the switch being coupled to the service control point via a respective signaling link, having respective ones of said second set of ports of the switch connected to said resources, and being arranged to connection at said first set of ports of speech paths of communication lines connected to service switching points of the intelligent communications network, and wherein the service defining means is arranged to define a plurality of services and is operable to generate a reserve resource type request for requesting reservation of a required type of resource of said plurality of types of resources upon receipt of call details received from the switch in respect of an incoming call routed to the switch from a service switching point, and the service controlling means is arranged (a) to response to the incoming call to place details of the call in corresponding service queues, (b) to pass details of the incoming call to the service defining means from the top of a service queue;

(c) to respond to receipt of a said reserve resource type request from the service defining means by selecting a resource of the required type requested whose status is free, changing its status to in use, and including the identity of the selected resource in the details of the call, (d) to respond to receipt of a connection request signal from the service defining means for the selected resource to be connected to the call by sending to the switch a connection command to connect the call to the respective speech path for the selected resource, (e) to respond to receipt from the service defining means of a command for the required type of resource to perform its respective function by sending to the selected resource a perform function command signal, (f) to respond to receipt from the service defining means of a command for disassociating the service defining means from the call by storing the then current details of the call, (g) to respond to receipt from the service defining means of a request for the service defining means to pass to the service defining means the call details then at the top of that service queue, and (h) to respond to receipt from a resource of a function finished signal by updating the stored details of the corresponding call and passing the updated details from store to the bottom of the corresponding service queue.

2. A service node as in claim 1, wherein the service controlling means comprises a common resource handler having a first part arranged to:

respond to receipt of the reserve resource type request signal to perform the selection of the free resource and the provision of its identity for inclusion in the call details, and provide for the service defining means a resource reserved signal upon completion of the reservation of the free resource.

3. A service node as in claim 2, wherein the common resource handler also has a second part arranged to:

respond to receipt of the perform function command signal by selecting from a plurality of dialogue identities a dialogue identity having a free status, changing its status to in use, providing the selected dialogue identity to be included in the details of the call in association with the selected resource identity, and sending the perform function command signal in association with the selected dialogue identity to the selected resource.

4. A method of operating a service node in an intelligent communications network for providing services for customers connected via local communication lines to service switching points of the intelligent communications network, wherein said service node includes therewithin:

a service control point having service defining means and service controlling means;

a peripheral platform comprising a plurality of types of resources, there being, for each of said types of resource, a plurality of resources for performing a particular call processing function associated with the respective type of resource, the peripheral platform being coupled to the service control point via a respective signalling link; and a switch arranged for connection between ones of a first set of ports and ones of a second set of ports, the switch being coupled to the service control point via a respective signalling link, having respective ones of said second set of ports of the switch connected to said resources, and being arranged for connection at said first set of ports of speech paths of communication lines connected to service switching points of the intelligent communications network, said method comprising the steps of:

receiving at said switch a call routed to the service node from a service switching point of the network, identifying by said service controlling means a requested service and placing details of the call in a corresponding service queue;

passing details of the call, when having highest priority in the service queue, to said service defining means when it is next ready to process a call;

generating a reserve resource type request for requesting reservation of a free resource of a particular type;

selecting, in response to said reserve resource type request, a free one of a plurality of resources of said particular type, each being arranged to respond to receipt of a perform function command by performing its respective function;

changing the status of the selected resource from free to in use, and including the identity of the selected resource in the call details;

connecting the selected resource to the incoming call by said switch in response to a connection command from the service defining means;

performing by the selected resource its respective call processing function;

storing the call details current at the time of commanding the selected resource and releasing the service defining means to process another call;

generating by the selected resource function finished signal and in response updating stored call details; <placing updated call details at the bottom of the corresponding service queue; and maintaining the in use status of the selected resource until the call is terminated or the service defining means determines that the selected resource is no longer required.

5. A method as in claim 4, wherein the selection of the free resource and the provision of its identity for inclusion in the call details are performed by a first part of a common resource handler of the service controlling means, and including the step of:

providing by said first part a resource reserved signal for the service defining means upon completion of the reservation of the free resource.

6. A method as in claim 5, including the steps of:

selecting from a plurality of dialogue identities, by means of a second part of the common resource handler in response to receipt of the perform function command, a dialogue identity having a free status, changing its status to in use, providing the selected dialogue identity to be included in the details of the call in association with the selected resource identity, and sending the perform function command in association with the selected dialogue identity to the selected resource.

* * * * *